(No Model.)

W. J. ORMSBY.
LOOSE PULLEY LUBRICATOR.

No. 310,536. Patented Jan. 6, 1885.

Witnesses:
Robert Kirk
Dugald McKillop

Inventor:
William J Ormsby
By J. S. Zerbe
Attorney.

UNITED STATES PATENT OFFICE.

WILLIAM J. ORMSBY, OF CINCINNATI, OHIO.

LOOSE-PULLEY LUBRICATOR.

SPECIFICATION forming part of Letters Patent No. 310,536, dated January 6, 1885.

Application filed October 16, 1884. (No model.)

*To all whom it may concern:*

Be it known that I, WILLIAM J. ORMSBY, of Cincinnati, in the county of Hamilton and State of Ohio, have invented a new and useful Improvement in Loose-Pulley Lubricators, which improvement is fully set forth in the following specification and accompanying drawings, in which—

Figure 1:
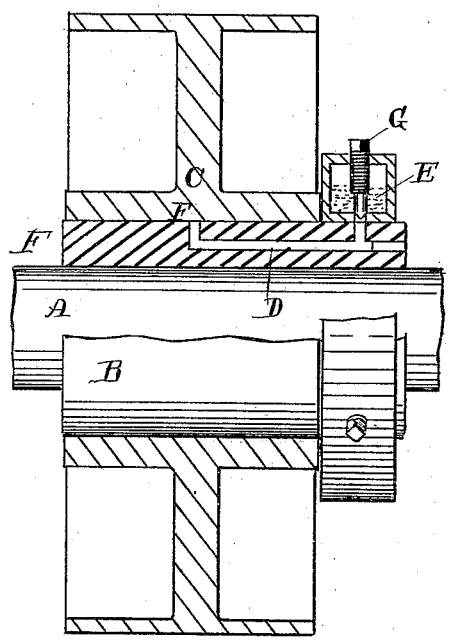
Figure 2:
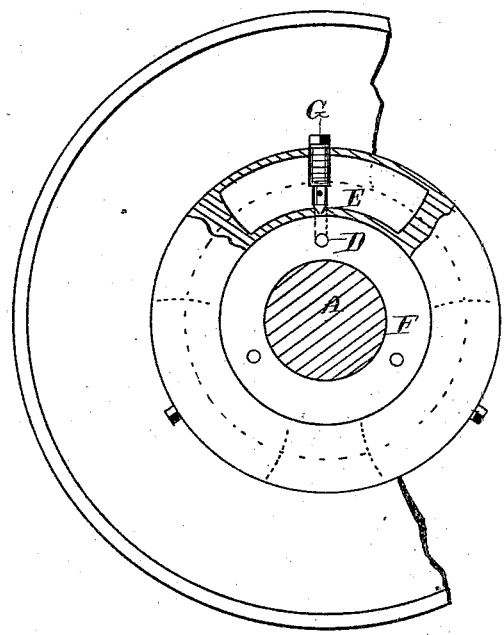

Figure 1 is a side view, partly in section, showing the loose-pulley lubricator. Fig. 2 is a cross view of the same, partly in section; and Fig. 3, a view of the same, partly modified.

It is the object of this invention to provide a lubricator for loose pulleys; and to this end I place upon the shaft a cylindrical shell or sleeve, which has at one end a series of oil-cups, or an annular oil-reservoir, with ducts leading through the shell or sleeve, so as to convey the oil to the central surface of the shell, which comes in contact with the loose pulley, the loose pulley being placed upon this shell or sleeve, all of which will now be set forth in detail.

In the accompanying drawings, A represents a shaft, and B a shell or sleeve shrunk on the shaft, or otherwise rigidly attached thereto.

C is a pulley on the shell B. The shell B is provided with one or more ducts, D, which communicate at one end with the oil-reservoir E, and have an outlet, F, against the bearing-surface of the pulley C. It will be observed that the pulley-hub is narrower than the length of the shell B, so that the annular reservoir E, as shown in Fig. 1, projects out past the hub.

Figure 3:
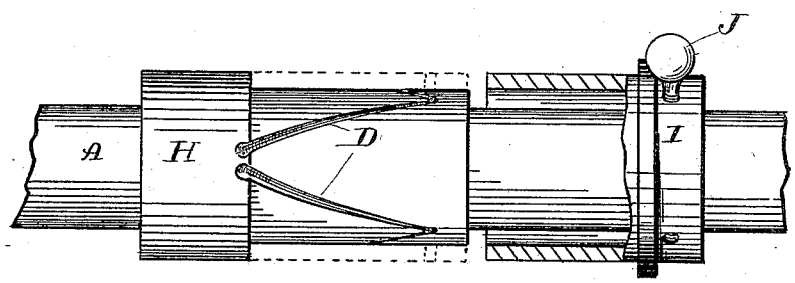

G is the set-screw through the reservoir, having its inner end conical tapering, so as to enter the mouth of the duct D, by means of which the flow of oil may be regulated. Should it be desirable to form these ducts spirally, as shown in Fig. 3, the shell is preferably made of two sections, H I, the latter, I, partly overlapping the section H, and the ducts D are formed spirally. This construction is in some instances preferable, and when so made it is better to make the shell in two sections, as the ducts can thereby be the more readily formed. I also design, as shown in Fig. 3, to use one or more independent oil-cups, J, as shown on the end of the shell I in Fig. 3, without departing from the spirit of my invention. When, however, the oil-reservoir E is annular in form, as shown in Fig. 1, it is obvious that this reservoir may be cast with the shell or constructed independent, and afterward placed on. Instead of having the ducts rest parallel with the shaft A, as shown in Fig. 1, or spirally, as in Fig. 3, they may be formed diagonally through the shell, or in any other manner, so as to convey the oil against the wearing-surface of the hub-pulley.

In operation the oil in the reservoir or cups will pass down into the duct D, and thence out the opening F against the hub of the pulley.

What I claim is—

1. A loose-pulley lubricator consisting of a shell or sleeve securely attached to the shaft, and having therein one or more oil-ducts, as shown, communicating with the oil-reservoir, in combination with the oil-reservoir, substantially as herein described.

2. In a loose-pulley lubricator, the combination of the shaft A with the shell or sleeve B, firmly attached thereon, having one or more ducts communicating with the oil-reservoir and the pulley, as and for the purpose substantially as herein described.

In testimony that I claim the foregoing I have hereunto set my hand, this 4th day of October, 1884, in the presence of witnesses.

WILLIAM J. ORMSBY.

Witnesses:
T. J. HAMER,
JOHN R. THOMPSON.